J. R. HAMILTON.
CUTTER FOR PIPE AND THE LIKE.
APPLICATION FILED NOV. 17, 1909.
969,858.
Patented Sept. 13, 1910.
2 SHEETS—SHEET 2.
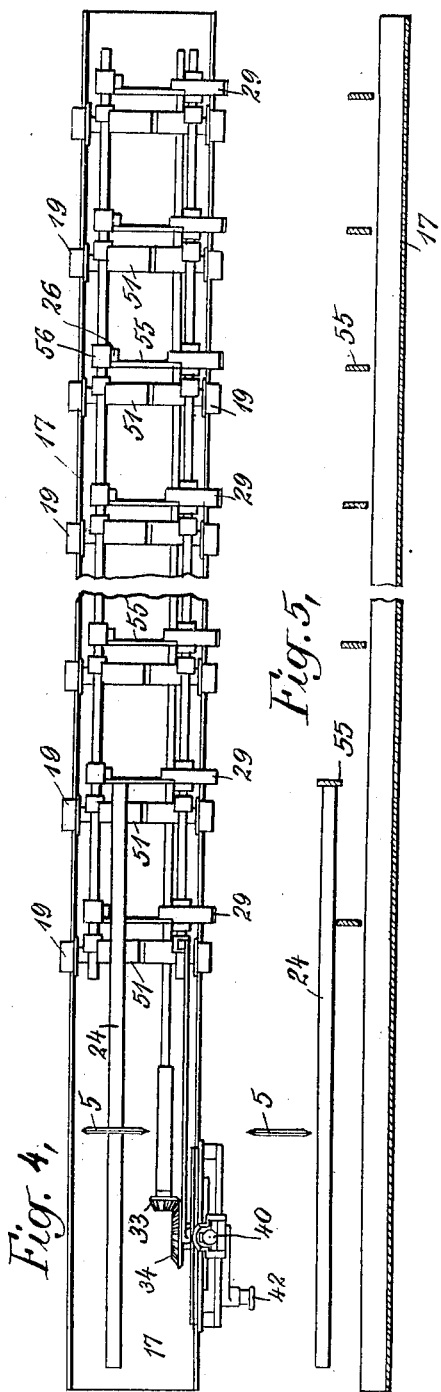
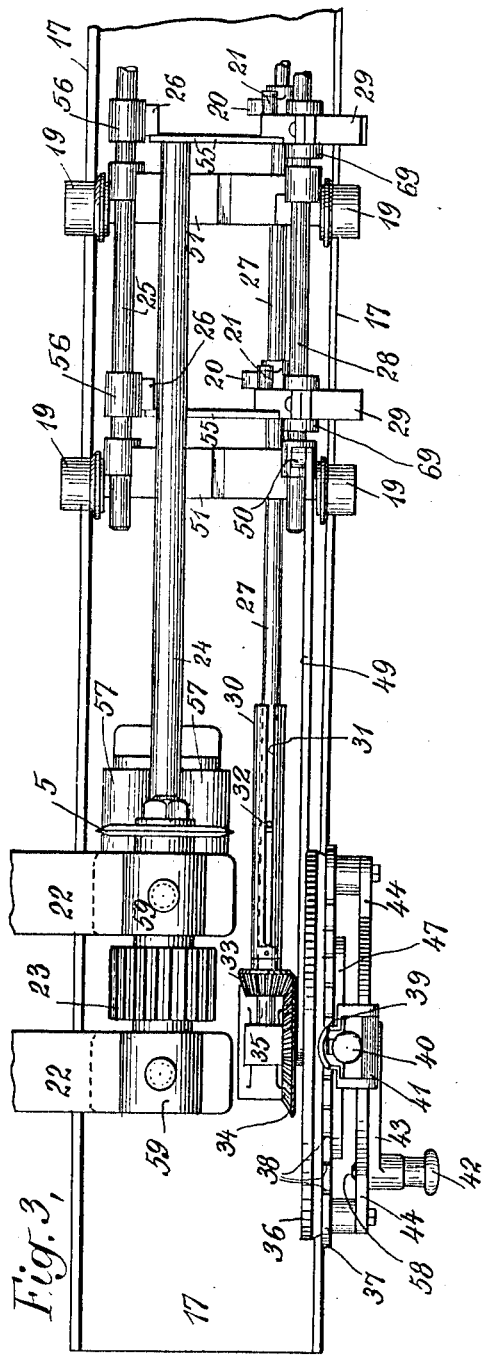
WITNESSES
INVENTOR
John R. Hamilton
BY
Duncan & Duncan ATTORNEYS

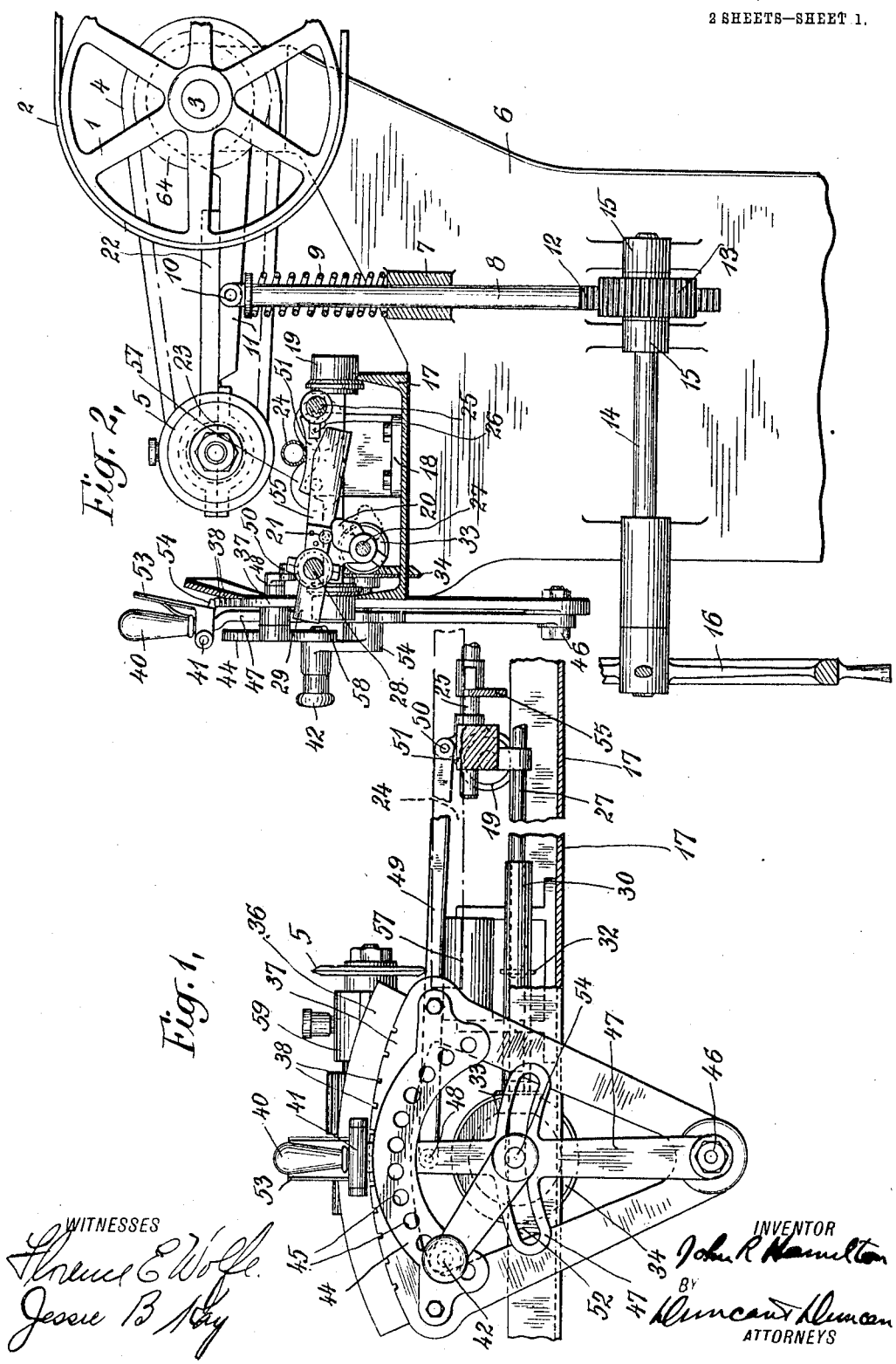
J. R. HAMILTON.
CUTTER FOR PIPE AND THE LIKE.
APPLICATION FILED NOV. 17, 1909.
969,858.
Patented Sept. 13, 1910.
2 SHEETS—SHEET 1.

UNITED STATES PATENT OFFICE.

JOHN R. HAMILTON, OF YONKERS, NEW YORK, ASSIGNOR TO VENTURA ALARM COMPANY, OF DOVER, NEW JERSEY, A CORPORATION OF NEW JERSEY.

CUTTER FOR PIPE AND THE LIKE.

969,858.

Specification of Letters Patent. Patented Sept. 13, 1910.

Application filed November 17, 1909. Serial No. 528,450.

*To all whom it may concern:*

Be it known that I, JOHN R. HAMILTON, a citizen of the United States, and resident of Yonkers, in the county of Westchester, State of New York, have made a certain new and useful Invention Relating to Cutters for Pipe and the Like, of which the following is a specification, taken in connection with the accompanying drawings, which form part of the same.

This invention relates to cutters for pipe and the like, and relates especially to cutting apparatus by which pipes, rods, or other material may be quickly cut into different sized lengths by providing a series of spaced stops, any one of which may be operated by a controller and moved into the path of the pipe to act as a distance piece therefor. A suitable adjuster and connected adjusting devices make possible a fine relative adjustment between the set of stops and the cutter, either one of which may be movably mounted, this fine adjustment covering the distance between two adjacent stops so that the apparatus may be quickly and accurately set for any length desired.

In the accompanying drawings showing in a somewhat diagrammatic way an illustrative embodiment of the invention, Figure 1 is a vertical longitudinal section of part of the device. Fig. 2 is a corresponding transverse section. Fig. 3 is a top view showing substantially the same parts. Fig. 4 is a diagrammatic top view on a smaller scale showing substantially the whole apparatus; and Fig. 5 is a diagrammatic longitudinal section thereof.

In the illustrative embodiment of this invention shown in the drawings, the stops may be mounted on suitable rods, such as 25, 28 extending longitudinally of the machine and supported in any desired way. The guide blocks 51 may be mounted between these two rods to rigidly hold them in proper position and the lugs 26 on the collars 56 on one of these rods may be securely fastened thereto at the proper intervals so as to coöperate with the movable stops 55. These stops may be movably mounted in any desired way as by securing them to the stop yokes 29 operating between the pairs of collars 69 secured to the rod 28 and any desired means may be used for moving the desired stop into operative position. For example, the cam shaft 27 may be mounted in suitable blocks adjacent the rod 28 and carry the series of angularly spaced stop cams 20, each engaging the stop roll 21 on the corresponding stop. As this cam shaft is rotated one after the other of the stops is raised from the inoperative position shown in Fig. 2 to such an extent as to be brought in front of the corresponding lug 26 and into the path of the pipe, rod or other article 24, which as indicated may rest on the blocks 51.

A suitable controller may be provided to actuate the stops as desired, and this controller may be in the form of the controller arm 54 to which the control gear 34 is secured and rotatably mounted in a suitable bearing, such as 35, see Fig. 3. The control pinion 33 coöperates with this gear 34 and is secured to the tube 30 formed with the slot 31 in which the pin 32 on the cam shaft 27 operates, so that the cam shaft is rotated by the controller. The locking knob 42 may be provided at the end of the controller arm and be connected with a suitable locking pin 58 engaging the locking holes 45 in the controller arm 44 so as to rigidly hold the controller arm and connected stop devices in position and maintain the proper stop in operative position in the path of the article so that the desired length will be severed by the cutter of any desired form such as the rotary cutter 5.

In this instance, the cutter is not mounted for longitudinal movement and the relative longitudinal movement between the cutter and stops is provided by mounting the stops so that they are bodily movable with respect to the cutter. For this purpose, the wheels 19 are provided on the blocks 51 so as to coöperate with the track 17 and enable the series of blocks, stops and connecting rods which form a carriage to be accurately adjusted as desired. The adjuster may be in the form of the adjusting lever 47 pivoted about the pin 46, see Figs. 1 and 2, and provided with the adjuster handle 40 at its upper end with which if desired a suitable latch 54 may be arranged to coöperate with the notches 38 in the latch plate 37, this latch being mounted on the latch handle 53 pivoted about the pin 41 to accurately indicate the adjustment effected. A suitable adjusting rod 49 may be pivoted by the pin 48 to the adjuster lever and by the pin 50 to one of the blocks 51 so as to bodily shift the carriage and its blocks and stops with respect to the cutter to the extent desired, the amount of this adjustment being of course sufficient to cover the interval between two adjacent stops, so that by operating the desired stop and effecting the intermediate adjustment by the adjuster any desired length can be secured.

The rotary cutter 5 may be mounted in suitable journals 59 and operated by the cutter gear 23 engaged by the diagrammatically indicated gear chain 4 operated by the drive gear 64 on the drive shaft 3, this drive shaft being operated in any desired way as by the pulley 1 and belt 2 thereon, see Figs. 2 and 3. The arms 11, 22 may be swingingly mounted on the drive shaft 3 in the frame 6 so as to oscillatingly support the cutter and these arms may be operated by the actuating wheel 16 mounted on the shaft 14 having suitable bearings, such as 15, in the frame and carrying the actuating gear 13 coöperating with the rack 12 on the actuating bar 8. This actuating bar 8 may be pivoted by the pin 10 to the cutter arm 11 which may be normally held in its upper inoperative position by the spring 9 above the guide 7 through which the actuating bar operates. By this means the continuously rotating cutter may be drawn down by the actuating wheel and connections into engagement with the pipe 24 upon the cutting rolls 57 mounted in the bracket 18 so as to sever the length of pipe which may then be removed and another pipe section brought forward until its end engages the acting stop 55 at the proper distance from the cutter, as shown in Figs. 3 and 5. Any desired number of pieces of pipe or the like may thus be severed and then the apparatus set for any other length desired by the adjuster and controlling devices indicated.

Having described this invention in connection with a number of illustrative embodiments, forms, numbers and arrangements of parts, to the details of which disclosure the invention is not of course to be limited, what is claimed as new and what is desired to be secured by Letters Patent is set forth in the appended claims.

1. In cutting apparatus for pipe or the like, a frame and connected track, a drive shaft mounted in said frame, a rotary cutter mounted in arms swingingly supported by said drive shaft, gearing operating said cutter from said drive shaft, an actuating wheel and gearing connected with said arms to actuate said cutter, cutter rolls coöperating with said cutter, a carriage provided with wheels engaging said track and connected guide blocks and rods, lugs mounted at intervals on said rods and movable stops mounted on said rods to coöperate with said lugs and provided with stop rolls, a cam shaft mounted on said carriage and carrying angularly spaced cams to coöperate with said stop rolls and selectively operate said stops and move the same into the path of an article upon said guide blocks, a controller having locking devices and gearing to operate said cam shaft, an adjuster mounted adjacent said controller and provided with a latch and latch plate, and an adjusting rod connecting said adjuster and carriage to adjust the same with respect to said cutter throughout a distance as great as the distance between adjacent stops.

2. In cutting apparatus for pipe or the like, a frame and connected track, cutter rolls mounted adjacent said track, a rotary cutter movably mounted to coöperate with said cutter rolls, an actuating wheel and gearing to actuate said cutter, a carriage coöperating with said track and comprising connected rods and guide blocks in line with said cutter rolls, movable stops mounted at intervals on said rods, a cam shaft mounted on said carriage and carrying angularly spaced cams to selectively operate said stops and move the same into the path of an article on said guide blocks, a controller to operate said cam shaft, and an adjuster and connected adjusting devices connected with said carriage to adjust the same with respect to said cutter throughout a distance as great as the distance between adjacent stops.

3. In cutting apparatus for pipe or the like, a frame and connected track, a movably mounted rotary cutter, actuating means to actuate said cutter, a carriage coöperating with said track and comprising rods and connected guides and movable stops mounted at intervals on said carriage, a controller to selectively operate said stops and move the same into the path of an article on said guides and an adjuster connected to said carriage to adjust the same with respect to said cutter.

4. In cutting apparatus for pipe or the like, a frame, a movably mounted cutter and actuating means to actuate said cutter, a rod and connected guides, movable stops mounted at intervals on said rod, a controller to selectively operate said stops and move the same into the path of an article on said guides, and an adjuster to adjust the relative position of said cutter and stops throughout a distance as great as the distance between adjacent stops.

5. In cutting apparatus for pipe or the like, a frame, a movably mounted cutter on said frame, means to actuate said cutter, guides for an article, a series of movable stops mounted at intervals, a controller to selectively operate said stops and move the same into the path of an article upon said guides and an adjuster mounted adjacent said controller to adjust the relative position of said cutter and stops.

6. In cutting apparatus for pipe or the like, a frame, a movably mounted cutter on said frame, means to actuate said cutter, guides for an article, a series of movable stops mounted at intervals away from said cutter, a cam shaft carrying angularly spaced cams to engage and selectively operate said stops and move the same into the path of an article upon said guides, a controller having gearing to operate said cam shaft and an adjuster to adjust the relative position of said cutter and stops.

7. In cutting apparatus for pipe or the like, a frame and connected track, a movably mounted cutter on said frame, means to actuate said cutter, a carriage coöperating with said track and comprising guides, movable stops mounted at intervals on said carriage, a controller to selectively operate said stops and move the same into the path of an article upon said guides and an adjuster mounted adjacent said controller and provided with a latch to adjust the position of said carriage with respect to said cutter.

8. In cutting apparatus for pipe or the like, a frame, a movably mounted cutter on said frame, means to actuate said cutter, guides for an article, a series of movable stops mounted at intervals away from said cutter and a controller to selectively operate said stops and move the same into the path of an article upon said guides.

9. In cutting apparatus for pipe or the like, a frame, a cutter mounted on said frame, guiding means for an article, a series of movable stops and a controller to selectively operate said stops and move the same into the path of an article upon said guiding means.

JOHN R. HAMILTON.

Witnesses:
HARRY L. DUNCAN,
JESSIE B. KAY.

It is hereby certified that the name of the assignee in Letters Patent No. 969,858, granted September 13, 1910, upon the application of John R. Hamilton, of Yonkers, New York, for an improvement in "Cutters for Pipe and the Like," was erroneously written and printed "Ventura Alarm Company," whereas said name should have been written and printed *Venturi Alarm Company;* and that the said Letters Patent should be read with this correction therein that the same may conform to the record of the case in the Patent Office.

Signed and sealed this 25th day of October, A. D., 1910.

[SEAL.]

E. B. MOORE,

*Commissioner of Patents.*